(12) United States Patent
Shah et al.

(10) Patent No.: US 7,519,079 B2
(45) Date of Patent: Apr. 14, 2009

(54) GENERIC ROUTING ENCAPSULATION OVER POINT-TO-POINT PROTOCOL

(75) Inventors: Chirayu Shah, Germantown, MD (US); Sanjay Rao, Herndon, VA (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 723 days.

(21) Appl. No.: 10/936,287

(22) Filed: Sep. 8, 2004

(65) Prior Publication Data

US 2006/0050696 A1    Mar. 9, 2006

(51) Int. Cl.
H04J 3/16    (2006.01)
H04J 3/22    (2006.01)

(52) U.S. Cl. .................. 370/466; 370/230; 370/232; 370/235; 370/236; 370/237; 370/221; 370/223; 370/225; 370/227; 370/228; 370/395.52; 370/400; 370/401; 370/465; 370/467; 709/239; 709/238; 709/232; 709/240; 709/225; 709/235

(58) Field of Classification Search ............... None
See application file for complete search history.

(56) References Cited

U.S. PATENT DOCUMENTS 6,779,051 B1 *   8/2004   Basil et al. ............... 710/33
7,185,107 B1 *   2/2007   Cassar ..................... 709/239
7,324,499 B1 *   1/2008   Borella et al. ........... 370/349
2004/0081203 A1   4/2004  Sodder et al.

FOREIGN PATENT DOCUMENTS

WO   WO 2004/036849 A   4/2004

OTHER PUBLICATIONS

James Carlson et al; PPP Vendor Protocol; Feb. 2004.
W. Simpson; The Point-to-Point Protocol (PPP); Jul. 1994.
G. Dommety; Key and Sequence Number Extensions to GRE; Sep. 2000.
G. McGregor; The PPP Internet Protocol Control Protocol (IPCP); May 1992.
D. Farinacci; Generic Routing Encapsulation (GRE); Mar. 2000.
Carlson Sun Microsystems R Winslow L-3 Communications J: "Point-to-Point Protocol (PPP) Vendor Protocol" IETF Standard, Internet Engineering Task Force, IETF, CH, ISSN: 0000-0003 the whole document.
G. Dommety : "Key and sequence Number extensions to GRE" IETF Request for Comments, Sep. 2000. pp. 1-6, XP002303410 the whole document.
D. Farinacci: "Generic Routing Encapsulation (GRE)", Mar. 2000.
W. Simpson: The Point-to-Point Protocol (PPP): Jul. 1994.
G. McGregor, The PPP Internet Protocol Control Protocol (IPCP), May 1992.

* cited by examiner

Primary Examiner—William Trost, IV
Assistant Examiner—Raj Jain
(74) Attorney, Agent, or Firm—Roger S. Burleigh

(57) ABSTRACT

A system and method are described herein that are capable of reducing overhead while keeping the traffic separation characteristics between two routers by establishing and using a generic routing encapsulation (GRE) tunnel directly over a link running a point-to-point protocol (PPP) that connects the two routers. Because, the system and method run GRE sessions directly over the PPP link means there is no need to configure the GRE tunnel over an Internet Protocol (IP) connection which means that outer IP header information does not need to be sent across the link. The elimination of the outer IP header reduces the overhead in the traffic sent between the two routers.

22 Claims, 2 Drawing Sheets

GENERIC ROUTING ENCAPSULATION OVER POINT-TO-POINT PROTOCOL

BACKGROUND OF THE INVENTION

1. Field of the Invention

The present invention relates in general to a system and method for separating traffic between two routers by establishing and using a generic routing encapsulation (GRE) tunnel directly over a link running a point-to-point protocol (PPP).

2. Description of Related Art

The present invention is related to traffic separation over PPP. On Ethernet or Asynchronous Transfer Mode (ATM) interfaces, it is possible to separate traffic originating from different users or domains into different PPP sessions by running PPP over Ethernet (PPPoE) and PPP over ATM (PPPoA) respectively. Other point-to-point interfaces like Packet Over Sonet (POS) can be channelized to provide traffic separation. In the POS scenario one traffic type can be supported on each channel.

However, there is also a need to support traffic separation on unchannelized point-to-point interfaces to be able to take advantage of the bandwidth available on those unchannelized interfaces. Today there are different technologies that can be used to solve this traffic separation problem including, for example, Multiprotocol Label Switching (MPLS), Frame Relay and Internet Protocol (IP). MPLS can achieve traffic separation by assigning one label for each traffic type. Similarly Frame Relay can use one Data Link Connection Identifier (DLCI) for each traffic type. The present invention is related to the third option mentioned above, namely, the use of IP tunnels. IP tunneling is one of the most promising technologies that can be used to address the traffic separation problem. This is because most IP router vendors already support IP tunneling for other type of applications.

Referring to FIG. 1 (prior art), there is a block diagram of a system 100 which is used to describe how IP tunneling can help address the separation problem. As shown, the system 100 includes a point-to-point (PPP) link 102 and a GRE tunnel 104 which connects two routers R1 and R2. Hosts H1 and H3 are coupled to router R1. And, hosts H2 and H4 are coupled to router R2. If it is assumed that hosts H1 and H2 are in a different domain than hosts H3 and H4. Then the traffic going from host H1 to host H2 needs to go over a different GRE tunnel 104 than the traffic going from host H3 to host H4. In the traditional GRE tunneling scenario, all the traffic that comes into router R1 and is tunneled over to router R2 has a L2 frame 106 with a format as shown in the exploded view in FIG. 1. The frame 106 has this format because the GRE tunnel 104 in the traditional scenario has to be configured over an IP connection to enable traffic separation at Layer 3. And, when a GRE tunnel 104 is running over the PPP link 102 it is necessary to have IP encapsulation to carry a GRE header 108 and an outer IP header 110 across the GRE tunnel 104. But, the carrying of the outer IP header 110 which is used for routing is not required since the routers R1 and R2 are directly connected. Of course, carrying 20 extra bytes of IP header information in the outer IP header 110 which is not required can be expensive. As an example, if the traditional GRE tunneling scenario is used, for a 100 byte packet payload, the overhead of L2 and L3 headers can be 54 bytes, which accounts to 54% overhead. If the 20 bytes of extra overhead in the outer IP header 110 can be removed, then the total overhead would be reduced by 34%.

One way of solving this overhead problem is by supporting IP header compression. The problem with IP header compression is that it is a complex solution which utilizes many cycles in the central processing unit (CPU) and requires support to be exposed to all parts of the system. Accordingly, there is a need for a new system and method that addresses both the traffic separation problem and the overhead problem. This need and other needs are satisfied by the system and method of the present invention.

SUMMARY OF THE INVENTION

The present invention includes a system and method capable of reducing overhead while keeping the traffic separation characteristics between two routers by establishing and using a GRE tunnel directly over a link running PPP that connects the two routers. Because, the system and method run GRE sessions directly over the PPP link means there is no need to configure the GRE tunnel over an IP connection which means that outer IP header information does not need to be sent across the link. The elimination of the outer IP header reduces the overhead in the traffic sent between the two routers.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
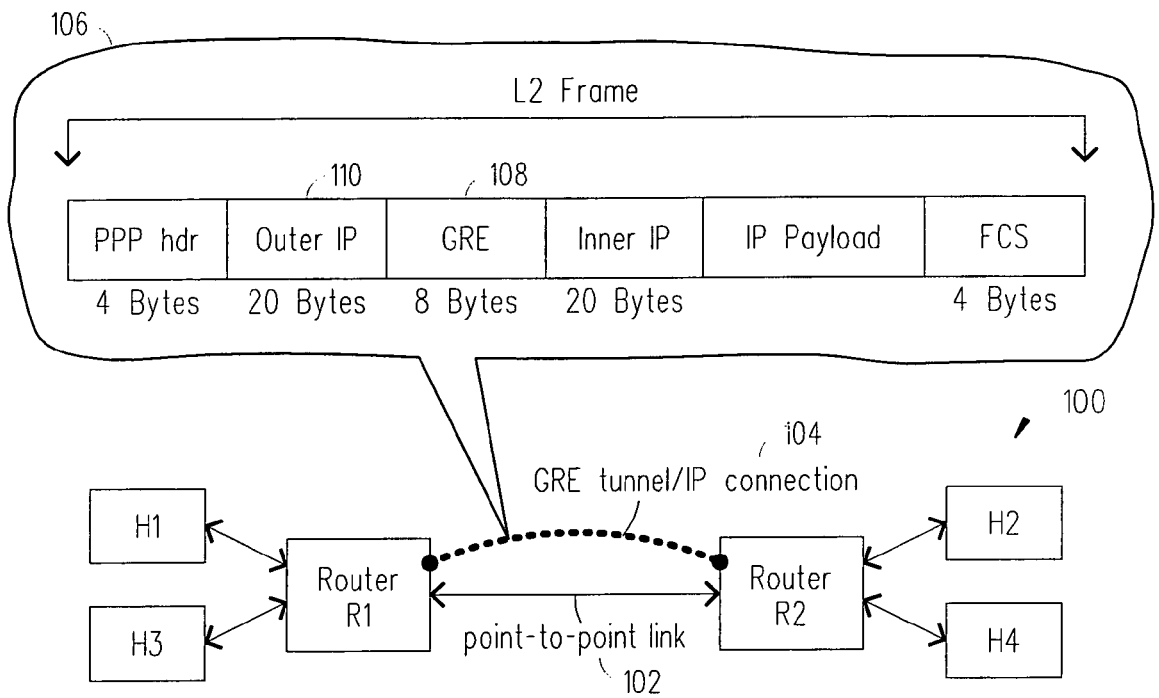
FIG. 1 (PRIOR ART) is a block diagram of a traditional system that utilizes IP tunneling and GRE tunneling between two routers in a manner that addresses a traffic separation problem but also causes an overhead problem with the traffic sent between the two routers.
Figure 2:
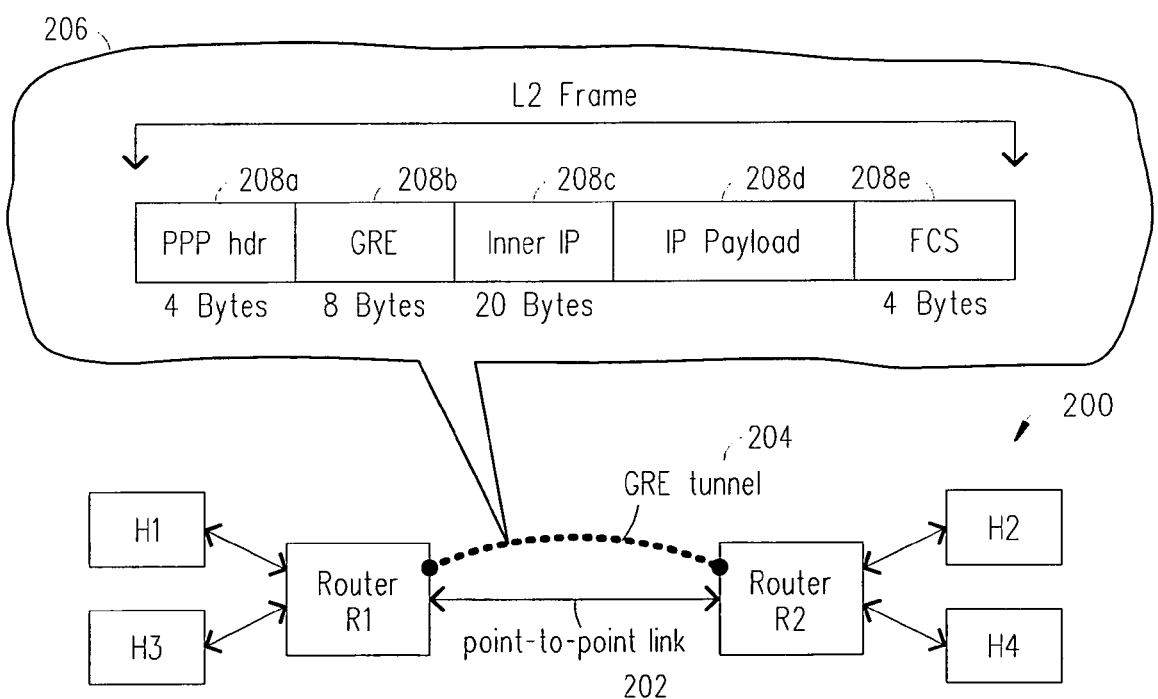
FIG. 2 is a block diagram of a system that utilizes GRE tunneling directly over a PPP link between two routers in a manner that addresses both the traffic separation problem and the overhead problem.
Figure 3:
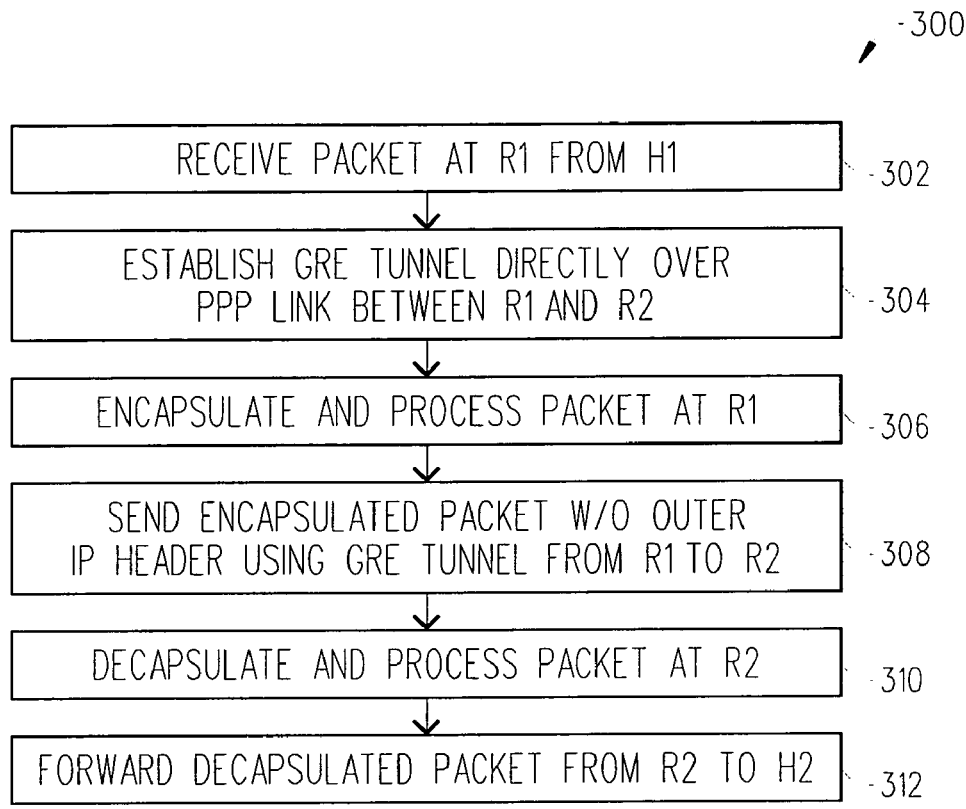
FIG. 3 is a flowchart illustrating the steps of a preferred method for separating traffic between two routers that are connected to one another in a system like the one shown in FIG. 2.

Referring to FIGS. 2 and 3, there are respectively shown a system 200 and a method 300 that utilize a GRE tunnel 202 directly over a PPP link 204 between two routers R1 and R2 in a manner that addresses both of the aforementioned traffic separation and overhead problems. Basically, the system 200 and method 300 keep the traffic separation characteristics while reducing the overhead by discarding an outer IP header 110 (see FIG. 1) from a frame 206 that is sent between two routers R1 and R2. To enable this, the system 200 and method 300 run GRE sessions directly over PPP instead of configuring the GRE sessions over an IP connection like in the prior art such that no outer IP header 110 needs to be sent across the PPP link 202 between routers R1 and R2.

In one embodiment of the present invention, the system 200 and method 300 perform the following steps to address the aforementioned traffic separation and overhead problems. Beginning at step 302, host H1 (or host H3) forwards a packet (not shown) to router R1. At step 304, the routers R1 and R2 establish the GRE tunnel 204 directly over the PPP link 202. At step 306, router R1 encapsulates and processes the packet such that is has a L2 frame 206 with a format that does not include an outer IP header 110 like the one shown in FIG. 1 but does include: a PPP header (4 bytes) 208*a*; a GRE header (8 bytes) 208*b*; an inner IP header (20 bytes) 208*c*; an IP payload (variable number of bytes) 208*d*; and a frame check sequence (FCS) (4 bytes) 208*e*. At step 308, router R1 sends the encapsulated packet 206 in the GRE tunnel 204 to router R2. At step 310, router R2 then decapsulates and processes the received packet 206. Lastly at step 310, router R2 forwards the decapsulated packet (not shown) to host H2 (or host H4). It should be noted that hosts H1 and H2 are in a different domain than hosts H3 and H4. It should also be noted that traffic going from host H1 to host H2 needs to go over a different GRE tunnel 104 (only one shown) than the traffic going from host H3 to host H4.

As can be seen, the system 200 and method 300 of the present invention when compared to the prior art reduces the size of the L2 frame 206 (packet 206) by at least 20 bytes which is the size of the outer IP header 110. The present invention is preferably applied in an application which has the following topology:

There is a need for traffic separation between peers such as routers R1 and R2 that are directly connected over a point-to-point interface 202.

There is no in-built mechanism in the underlying L2 technology for supporting multiple sessions.

There is a need to reduce overhead in the frames 206 that are sent on the point-to-point link 202 connecting routers R1 and R2.

GRE tunnels 204 are used for traffic separation at Layer 3.

GRE tunnels 204 are carried over IP.

One approach that can be used to implement the present invention is described next where the following areas are addressed:

(1) The PPP payload changes from IP payload 110 to GRE payload 208*b*. The current PPP standard assumes a standard NCP (Network Control Protocol) like IP or IPX. Since GRE is not a Network Control Protocol by itself, raw GRE packets cannot be sent as the PPP payload. Thus, the present invention cannot be achieved without extending the PPP protocol.

(2) The PPP protocol can be extended in two ways: (1) by extending the NCP (IPCP) negotiations; or (2) by extending the PPP protocol itself. The latter approach is discussed herein because there is a proposed internet-draft on negotiating vendor protocol entitled Vendor Specific Network Control Protocol [VSNCP]. The VSNCP is described in detail in "draft-ietf-pppext-vendor-protocol-02.txt". The contents of this document are incorporated by reference herein.

(3) The traditional GRE tunnel 104 is normally identified by (IP source, IP destination, IP protocol) tuple. However, since this information is lost when the outer IP header 110 is removed, GRE tunnel identification in the present invention has to be done using some other mechanism. In one mechanism, GRE keys can be used to identify a GRE tunnel 204. And, each GRE tunnel 204 can be assigned a GRE key that is unique system-wide. The GRE key would be located within the GRE header 208*b*.

These areas can be implemented as described in detail below with respect to the following topics: (A) configuration; (B) signalling; and (C) sending/receiving GRE data.

A. Configuration

The PPP protocol supports a new mode that allows the signaling with a peer (router R1 or R2). One way of doing this is by specifying a new mode in the PPP protocol which can be called for example "gre" mode. The process of specifying the "gre" mode indicates that the present invention is going to be used instead of IP.

In addition, the GRE tunnel configuration supports the use of GRE keys. GRE keys are described in RFC 2890 (September 2000) which is entitled "Key and Sequence Number Extensions to GRE". The contents of this document are incorporated by reference herein. As mentioned above, the GRE keys can be used to identify a GRE tunnel 204. And, each GRE tunnel 204 can be assigned a GRE key that is unique system-wide.

B. Signaling

The routers R1 and R2 need to carry out negotiation of the new "gre" control protocol. For this to happen, the PPP protocol utilizes VSNCP which specifies a way of sending vendor specific information across the PPP connection 202. By using VSNCP, the PPP layer can signal the use of GRE as the payload. The following paragraph uses the semantics of VSNCP to describe how VSNCP can be used in one embodiment of the present invention.

Figure 4:
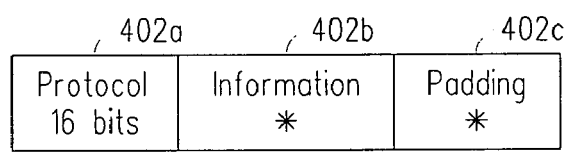
FIG. 4 is a block diagram that shows a possible format of a generic PPP packet that can be used during the negotiation between two routers to establish a GRE tunnel directly over a PPP link in an exemplary embodiment of the present invention.

FIG. 4 is a block diagram that shows a possible format of a generic PPP packet 400 that can be used during the negotiation of the "gre" control protocol between routers R1 and R2. It should be noted that frame 206 is sent in packet 400 format. To accomplish this, generic PPP software receives packet 400, processes it and sends the packet 400 to GRE-PPP specific software. This software finds information encoded in frame 206. As shown, the generic PPP packet 400 includes: a protocol section (16 bits) 402*a*; an information section 402*b*; and a padding section 402*c*. In this implementation, the protocol section 402*a* would have a value of 0x805b signifying the use of VSNCP. When the PPP packet 400 is received, the routers R1 and R2 then carry out an IPCP negotiation as described in the PPP Internet Protocol Control Protocol [IPCP]. The IPCP is described in detail in RFC 1661 (July 1994) entitled "the Point-To-Point Protocol (PPP)" and RFC 1132 (May 1992) entitled "The PPP Internet Protocol Control Protocol (IPCP)". The contents of these two documents are incorporated by reference herein. At the end of the IPCP negotiation, routers R1 and R2 mark the session as "gre", implying that the session is going to send and receive GRE. It should be noted that VSNCP messages are exchanged between the routers R1 and R2 following an authentication stage (if configured) or a link control protocol (LCP) Stage.

C. Sending/Receiving GRE data

Once the routers R1 and R2 negotiate the GRE session using the method described in the above section, VSNCP goes into an open state and the GRE session is ready to send and receive data. The GRE data can be sent using VSNP packets as described in VSNCP. In this example, the PPP Protocol field 402*a* is set to hex 0x005b (VSNP) and GRE data goes in the PPP Information field 402*b*.

Figure 5:
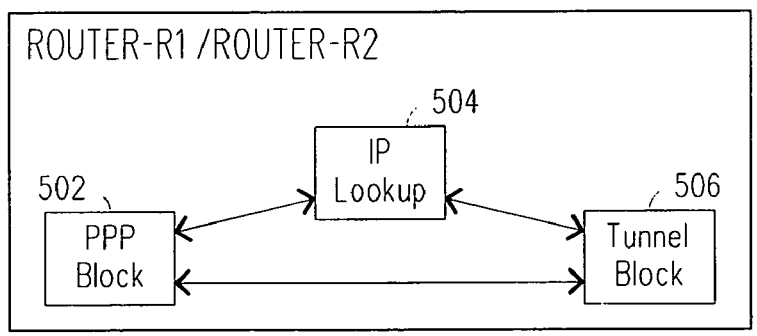
FIG. 5 is a block diagram that shows the different processing blocks that can be used within the routers of the exemplary embodiment of the present invention.

FIG. 5 is a block diagram that shows the processing blocks in routers R1 and R2 which are used to help describe one possible way of implementing the internal processing of packet 206 in routers R1 and R2. The PPP block 502 does the PPP level processing of packet 206. And, the IP Lookup 504 does the forwarding lookup to determine that the packet 206 needs to go out the point-to-point interface 202 using PPP protocol. The tunnel block 506 is involved in encapsulating and decapsulating the GRE header 208 in packet 206.

One way of encapsulating the frame 206 is described next where it is assumed the system 200 has the topology as shown in FIG. 2. In this example, host H1 is trying to send an IP packet 206 to host H2. When this packet 206 arrives at router R1, router R1 has to encapsulate the packet 206 and send it to router R2. In particular, the tunnel block 506 in router R1 encapsulates the packet 206 using the GRE encapsulation method as described in RFC 2784 (March 2000) entitled "Generic Routing Encapsulation (GRE)". The contents of this document are incorporated herein. Once the packet 206 is encapsulated, the IP Lookup block 504 determines that the packet 206 needs to be sent over the PPP link 202 and sends the packet 206 to the PPP Block 502. The PPP block 502 then strips-off the outer IP header 110 and only sends the GRE packet as the payload in the packet 206. The PPP block 502 also adds the VSNP header with Protocol field set to 0x005b in the packet 206. The VSNP header is mapped to the PPP header 208a in frame 206.

It should be appreciated that when the packet 296 is encapsulated and extra headers are added on to the initial IP packet, the size of the packet 206 increases and could result in the need to fragment the packet 206. Typically, this would occur after the IP lookup 502 determines that the packet 206 needs to go out of the PPP link 202. However, the fragmentation information would normally be sent in the outer IP header 110 because the packet 206 is fragmented after encapsulation. And, when the PPP protocol in accordance with the present invention strips-off the outer IP header 110 then the fragmentation information would be lost when the packet 206 reaches the other end of the GRE tunnel 204. A solution to this problem is that the tunnel block 506 could fragment the inner IP packet before encapsulation so that the fragmentation information lies in the inner IP header 208c which does not get stripped-off. Another advantage of doing this is that the expensive reassembly process is done at the final destination which in this example is host H2 instead of having to do it at the tunnel endpoint router R2.

One way of decapsulating the packet 206 when it arrives at router R2 is described next. When the packet 206 arrives at router R2, it is received by the PPP block 502 which recognizes the packet 206 as being a VSNP PPP packet. The PPP block 502 then strips-off the VSNP header and sends the packet 206 to the tunnel block 506 for decapsulation. The tunnel block 506 uses the GRE key information in the GRE header 208b to identify the session. Then, the tunnel block 506 strips-off the GRE header 208b and sends the packet 206 to the IP lookup 504 which routes the packet 206 to host H2 based on the information in the inner IP header 208c.

From the foregoing, it can be readily appreciated by those skilled in the art that the system 200 and method 300 provides a traffic separation solution while reducing the overhead by 20 bytes by discarding the outer IP header 110 from frame 206. The idea is to run GRE sessions directly over PPP. As such, no outer IP header information needs to be sent across the PPP link 202. The present invention also has the following features:

Configuration of GRE as PPP payload.
Use of VSNCP protocol for signaling GRE.
Stripping-off outer IP header and transmission of raw GRE data in PPP.
Use of VSNP for transmitting GRE data.
Translation of VSNP to GRE payload.
Configuration of GRE as PPP payload.
Configuration of GRE tunnel.
Use of PPP for signaling.
Encapsulation of GRE packet.
Use of GRE keys to identify GRE sessions.
Use of VSNP for identification as a special PPP packet.
Use of session information in GRE for decapsulation.
Decapsulation of GRE packet.

Following are some additional features, advantages and uses of the present invention:

The present invention can be used in a mobile packet backbone for circuit switched and packet switched core network.
The present invention can be used by companies associated with mobile networks, emerging markets, and public ethernet.
The present invention improves bandwidth utilization by cutting overhead in the IP header. For instance, the L2 and L3 header overhead of a normal PPP frame carrying IP/GRE traffic is 54 bytes. Reducing this overhead to 34 bytes using the present invention results in savings of about 37% which gives better bandwidth utilization while achieving the same traffic separation characteristics.
The present invention does not mandate use of complex technologies like MPLS.
The present invention can utilize a GRE tunnel 204 that carries a different traffic type or a GRE tunnel 204 that has multiple sessions with each session carrying a specific traffic type.
The present invention restricts proprietary extensions in the PPP implementation and does not expose it to other parts of the system.
It should be noted that POS interfaces are commonly used today as long and short haul WAN links and that traffic separation has become a valuable feature. So, companies like Cisco, Juniper/Unisphere, Redback, CoSine etc . . . that deal with POS interfaces may want to implement something similar to the present invention to improve bandwidth utilization.
Although a system 200 with only two routers R1 and R2 and four hosts H1-H4 is described above it should be understood that the system 200 can have many more routers and hosts that can be connected to one another in a variety of ways.
It should be appreciated that many components and details associated with the system 200 described above are well known in the industry. Therefore, for clarity, the description provided above omitted those well known components and details that are not necessary to understand the present invention.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A method for separating traffic between a first router and a second router that are connected to one another by a link running point-to-point protocol (PPP), said method comprising the steps of: receiving a packet at said first router from a first host; establishing a generic routing encapsulation (GRE) tunnel directly over the link between said first router and said second router; encapsulating and stripping-off an outer Internet Protocol (IP) header from the packet at said first router; sending the encapsulated packet using said GRE tunnel from said first router to said second router; decapsulating and processing the received packet at said second router; and forwarding the decapsulated packet from said second router to a second host.

2. The method of claim 1, wherein said encapsulated packet sent in said GRE tunnel has a frame with a format that does not include the outer IP header but does include: a PPP header (4 bytes); a GRE header (8 bytes); an inner IP header (20 bytes); an IP payload (variable number of bytes); and a frame check sequence (FCS) (4 bytes).

3. The method of claim 1, wherein said step of establishing the GRE tunnel is possible due to the extension of the PPP by extending negotiations in a network control protocol (NCP).

4. The method of claim 1, wherein said step of establishing the GRE tunnel is possible due to the extension of the PPP by supporting a vendor specific network control protocol (VSNCP).

5. The method of claim 1, wherein said step of establishing the GRE tunnel directly over the link between said first router and said second router includes: configuring the PPP to support the GRE tunnel instead of an IP tunnel; configuring the GRE tunnel to support the use of system wide unique GRE keys; and signaling between said first router and said second router to negotiate a GRE session to enable the sending and receiving of packets over the GRE tunnel.

6. The method of claim 1, wherein said step of encapsulating and stripping-off the outer IP header from the packet at said first router includes: using a tunnel block to encapsulate the packet received from said first host; using an IP block to determine if the encapsulated packet needs to be sent over the link to said second router; and if yes, using a PPP block to strip-off the outer IP header and add a vendor specific network protocol (VSNP) header to the encapsulated packet which is then sent over the link to said second router.

7. The method of claim 6, further comprising the step of using the tunnel block to fragment an inner IP header in the packet before encapsulating the packet.

8. The method of claim 1, wherein said step of decapsulating and processing the received packet at said second router includes: using a PPP block to strip-off a vendor specific network protocol (VSNP) header in the received packet; using a tunnel block to decapsulate and strip-off a GRE header in the packet received from the PPP block; and using an IP lookup to route the decapsulated packet to said second host.

9. The method of claim 1, wherein said GRE tunnel is identified by a system wide unique GRE key.

10. A system comprising: a first router; a second router; said first router receives a packet from a first host and negotiates with said second router to establish a generic routing encapsulation (GRE) tunnel directly over a point-to-point protocol (PPP) link that is located between said first router and said second router; said first router also encapsulates and strips-off an outer Internet Protocol (IP) header from the packet and then sends the encapsulated packet using said GRE tunnel to said second router; and said second router receives, decapsulates, processes and then sends the decapsulated packet to a second host.

11. The system of claim 10, wherein said encapsulated packet sent in said GRE tunnel has a frame with a format that does not include the outer IP header but does include: a PPP header (4 bytes); a GRE header (8 bytes); an inner IP header (20 bytes); an IP payload (variable number of bytes); and a frame check sequence (FCS) (4 bytes).

12. The system of claim 10, wherein said first router and said second router establish the GRE tunnel after the PPP is changed by extending negotiations in a network control protocol (NCP).

13. The system of claim 10, wherein said first router and said second router establish the GRE tunnel after the PPP is changed by supporting a vendor specific network control protocol (VSNCP).

14. The system of claim 10, wherein said first router and said second router establish the GRE tunnel directly over the link by performing the following steps: configuring the PPP to support the GRE tunnel instead of an IP tunnel; configuring the GRE tunnel to support the use of system wide unique GRE keys; and signaling between said first router and said second router to negotiate a GRE session to enable the sending and receiving of packets over the GRE tunnel.

15. The system of claim 10, wherein said first router includes: a tunnel block that encapsulates the packet received from said first host; an IP block that determines if the encapsulated packet needs to be sent over the link to said second router; and a PPP block that strips-off the outer IP header and adds a vendor specific network protocol (VSNP) header to the encapsulated packet if the packet is to be sent over the link to said second router.

16. The system of claim 15, wherein said tunnel block fragments an inner IP header in the packet before the packet is encapsulated.

17. The system of claim 10, wherein said second router includes: a PPP block that strips-off a vendor specific network protocol (VSNP) header in the received packet; a tunnel block that decapsulates and strips-off a GRE header from the packet received from the PPP block; and an IP lookup that routes the decapsulated packet to said second host.

18. The system of claim 10, wherein said GRE tunnel is identified by a unique GRE key.

19. A router that receives a packet from a host and then negotiates with another router to establish a generic routing encapsulation (GRE) tunnel that is directly over a link running point-to-point protocol (PPP), which is located between both routers, before stripping-off an outer Internet Protocol (IP) header from the packet and sending the stripped packet within said GRE tunnel to said another router.

20. The router of claim 19, wherein said stripped packet has a frame with a format that does not include the outer IP header but does include: a PPP header (4 bytes); a GRE header (8 bytes); an inner IP header (20 bytes); an IP payload (variable number of bytes); and a frame check sequence (FCS) (4 bytes).

21. A router that receives, from another router, a packet which does not have an outer Internet Protocol (IP) and which is sent in a generic routing encapsulation (GRE) tunnel formed directly over a link running point-to-point protocol (PPP) that connects both routers.

22. The router of claim 21, wherein said received packet has a frame with a format that does not include the outer IP header but does include: a PPP header (4 bytes); a GRE header (8 bytes); an inner IP header (20 bytes); an IP payload (variable number of bytes); and a frame check sequence (FCS) (4 bytes).

* * * * *